United States Patent
Pomponio, Sr.

(10) Patent No.: US 7,168,530 B2
(45) Date of Patent: Jan. 30, 2007

(54) WATERPROOF UNIVERSAL DRUM BRAKE HYDRAULIC CYLINDER

(76) Inventor: Richard Allen Pomponio, Sr., P.O. Box 1445, Orofino, ID (US) 83544

( * ) Notice: Subject to any disclaimer, the term of this patent is extended or adjusted under 35 U.S.C. 154(b) by 0 days.

(21) Appl. No.: 10/640,969

(22) Filed: Aug. 11, 2003

(65) Prior Publication Data
US 2005/0034938 A1 Feb. 17, 2005

(51) Int. Cl.
*F16D 51/00* (2006.01)

(52) U.S. Cl. ....................................................... 188/74

(58) Field of Classification Search ................. 188/74, 188/72.4, 72.5
See application file for complete search history.

(56) References Cited

U.S. PATENT DOCUMENTS

| | | | | |
|---|---|---|---|---|
| 4,024,932 A | * | 5/1977 | Fay | 188/106 P |
| 4,553,471 A | * | 11/1985 | Brademeyer | 91/173 |
| 4,615,419 A | * | 10/1986 | Gaiser | 188/181 T |
| 4,781,276 A | * | 11/1988 | Berisch et al. | 188/361 |
| 4,804,017 A | * | 2/1989 | Knapp | 137/614.16 |
| 2002/0179381 A1 | * | 12/2002 | Wilkin | 188/74 |

* cited by examiner

*Primary Examiner*—Xuan Lan Nguyen
(74) *Attorney, Agent, or Firm*—Graybeal Jackson Haley LLP

(57) ABSTRACT

The invention discloses an improved drum brake hydraulic cylinder. In a preferred embodiment, the invention discloses an O-ring in an annular groove to seal the cylinder. One specifically disclosed embodiment shows an additional exterior seal over the piston and the opening of the cylinder chamber and an optional cup seal. Another specifically disclosed embodiment shows universal drum brake hydraulic cylinder that may be used in left side and right side applications.

4 Claims, 3 Drawing Sheets

WATERPROOF UNIVERSAL DRUM BRAKE HYDRAULIC CYLINDER

The present invention discloses an improved drum brake hydraulic cylinder.

BACKGROUND OF THE INVENTION

1. Field of the Invention

This invention relates to drum brakes, and more specifically to an improved drum brake hydraulic cylinder device. The preferred embodiment of the disclosed invention is a brake cylinder made of a corrosion resistant metal, such as stainless steel, with an O-ring in an annular groove in the cylinder chamber. One specifically disclosed embodiment shows a brake cylinder with an additional exterior seal. Another specifically disclosed embodiment is universal to either left side drum brakes or right side drum brakes.

2. Discussion of Prior Art

Drum brake hydraulic brake cylinders are well-known in the prior art. These devices are used to spread the brake shoes, pressing them against the brake drum to slow the vehicle. In typical prior art devices, as shown in FIG. 1, the cylinder body (10) is made of steel, and the piston (18) is made of aluminum. Under pedal pressure, hydraulic fluid (not shown) enters through an inlet passage (12) into the cylinder chamber (34) and presses against a rubber cup seal (22) which drives the piston (18) out, spreading the brake shoes (not shown). To bleed the brakes, each cylinder has a bleeder valve (not shown) which must be at the top of the cylinder, the location of unwanted air. The bleeder valve is threaded into a bleeder valve passage (14) in the cylinder. Typical prior art devices are manufactured in left side and right side versions to locate the bleeder valve at the top of the cylinder.

Problems arise when these devices are immersed in salt water and fresh water, as is common with boat trailers. The cup seal does not seal the piston or the cylinder from water, and the piston may seize in the cylinder due to rust and corrosion.

Costs associated with left side and right side versions of brake cylinders are high. Separate left side and right side components must be designed, manufactured, and stocked. Mechanics must order and install the proper version.

SUMMARY OF THE INVENTION

It is one object of the present invention to provide a drum brake cylinder that will resist corrosion and seizing even after prolonged and repeated immersion in water. It is another object of the present invention to provide a drum brake cylinder that is protected against rust, dirt, water, corrosion, and other contamination. It is another object of the present invention to provide a drum brake cylinder that is a sealed unit. It is another object of the present invention to provide a drum brake cylinder that is universal for left-side or right-side application. It is another object of the present invention to provide a drum brake hydraulic cylinder that is simple and inexpensive to manufacture. It is another object of the present invention to provide a drum brake cylinder that is durable and easy to install.

In accordance with these objectives, the disclosed invention seals the piston and the brake cylinder with an O-ring in an annular groove in the cylinder adjacent the cylinder opening, and the cylinder body and piston are made of a corrosion-resistant metal such as stainless steel. Additional seals are disclosed and recommended. Because water cannot pass the O-ring adjacent the cylinder opening, the cylinder and piston are protected from rust and corrosion, and the piston will not seize in the cylinder even after repeated immersion in water. One embodiment of the disclosed invention works on either left side drum brakes or right side drum brakes, with dual bleeder valves and a universal bolt hole arrangement. This universal cylinder eliminates the costs of manufacturing two versions. The universal cylinder reduces the required inventory of components in manufacturing and in a repair shop, and simplifies replacement.

DESCRIPTION

Figure 1:
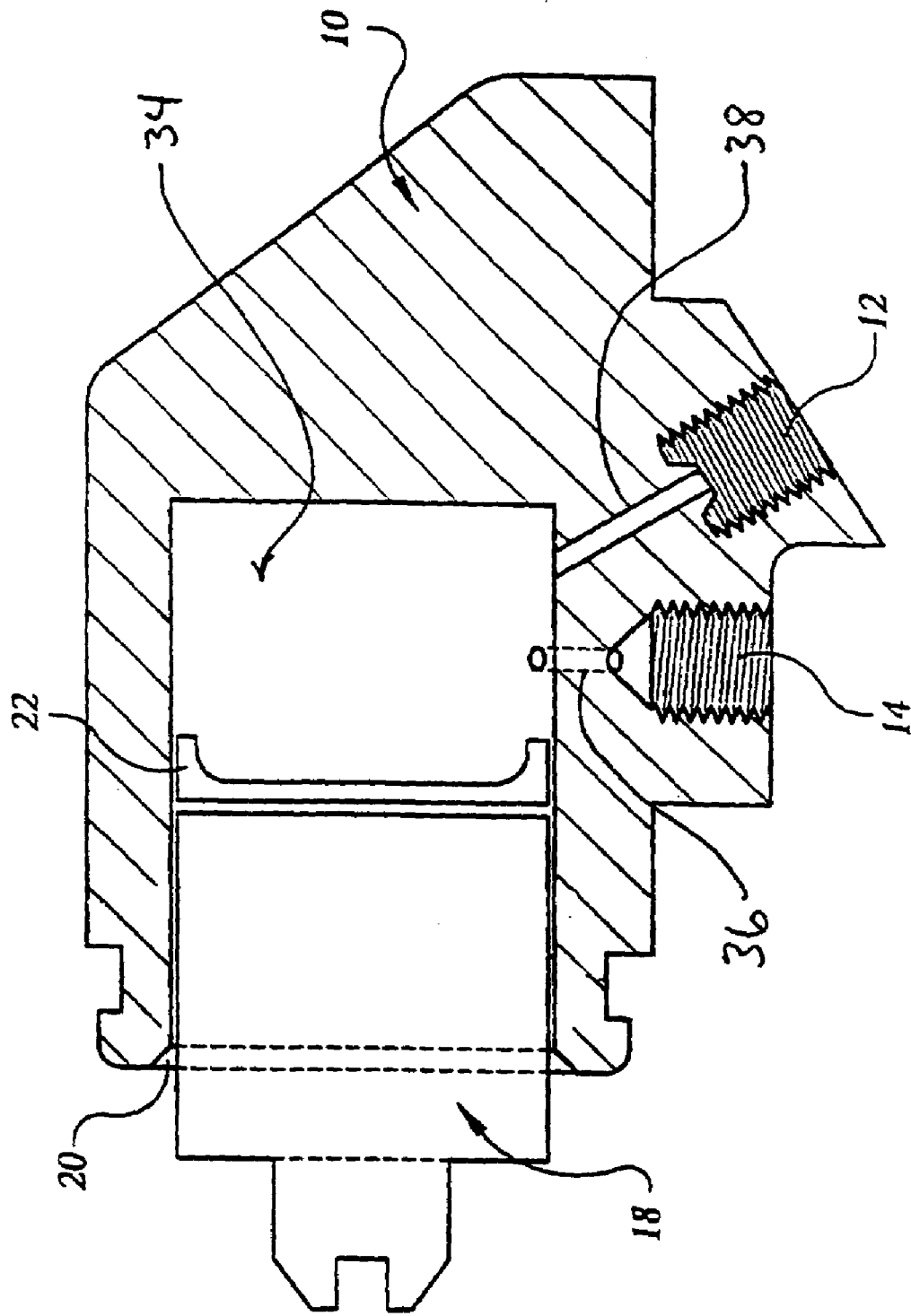
FIG. 1 is a cross section top view of a conventional drum brake cylinder.

FIG. 1 shows a cross section top view of a conventional prior art drum brake hydraulic cylinder. The cylinder body (10) has at least one open end (20) into a cylinder chamber (34), a bleeder valve (14) communicating with the cylinder chamber (34) through a bleeder passage (36), a hydraulic fluid inlet (12) communicating with the cylinder chamber (34) through an inlet passage (38), a cup seal (22) and a piston (18). Under pedal pressure, hydraulic fluid is forced into the cylinder chamber (34) and presses against the cup seal (22) which drives the piston (18) out of the cylinder chamber (34) to press the brake shoes against the brake drum (not shown).

Figure 2:
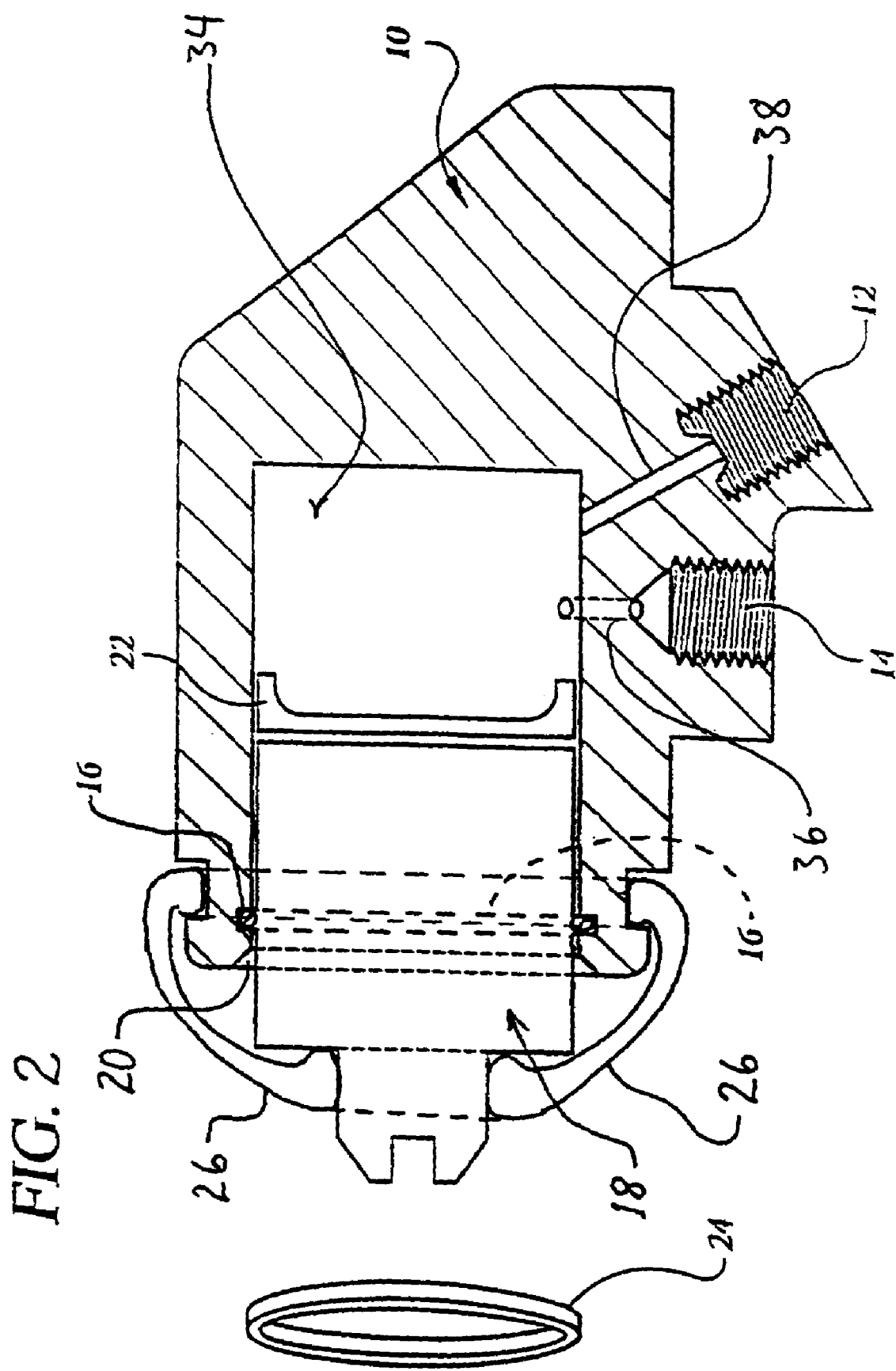
FIG. 2 is a cross section top view of a first specific embodiment of the disclosed invention.

FIG. 2 shows a first specific embodiment of the disclosed improved drum brake hydraulic cylinder invention. The cylinder body (10) has at least one open end (20) into a cylinder chamber (34), a bleeder valve (14) communicating with the cylinder chamber (34) through a bleeder passage (36), a hydraulic fluid inlet (12) communicating with the cylinder chamber (34) through an inlet passage (38), an optional cup seal (22) and a piston (18). Under pedal pressure, hydraulic fluid is forced into the cylinder chamber (34) which drives the piston (18) out of the cylinder chamber (34) to press the brake shoes against the brake drum (not shown).

The improvement shown in FIG. 2 comprises an O-ring (24) disposed in an annular groove (16) in the cylinder chamber (34) adjacent the open end (20), the cylinder body (10) and the piston (18) are made of a corrosion-resistant metal such as stainless steel and an exterior rubber seal (26) over the piston (18) and over the open end (20) of the cylinder chamber (34). The improved drum brake hydraulic cylinder shown in FIG. 2 may be repeatedly immersed in salt water or in fresh water without damage.

Figure 3:
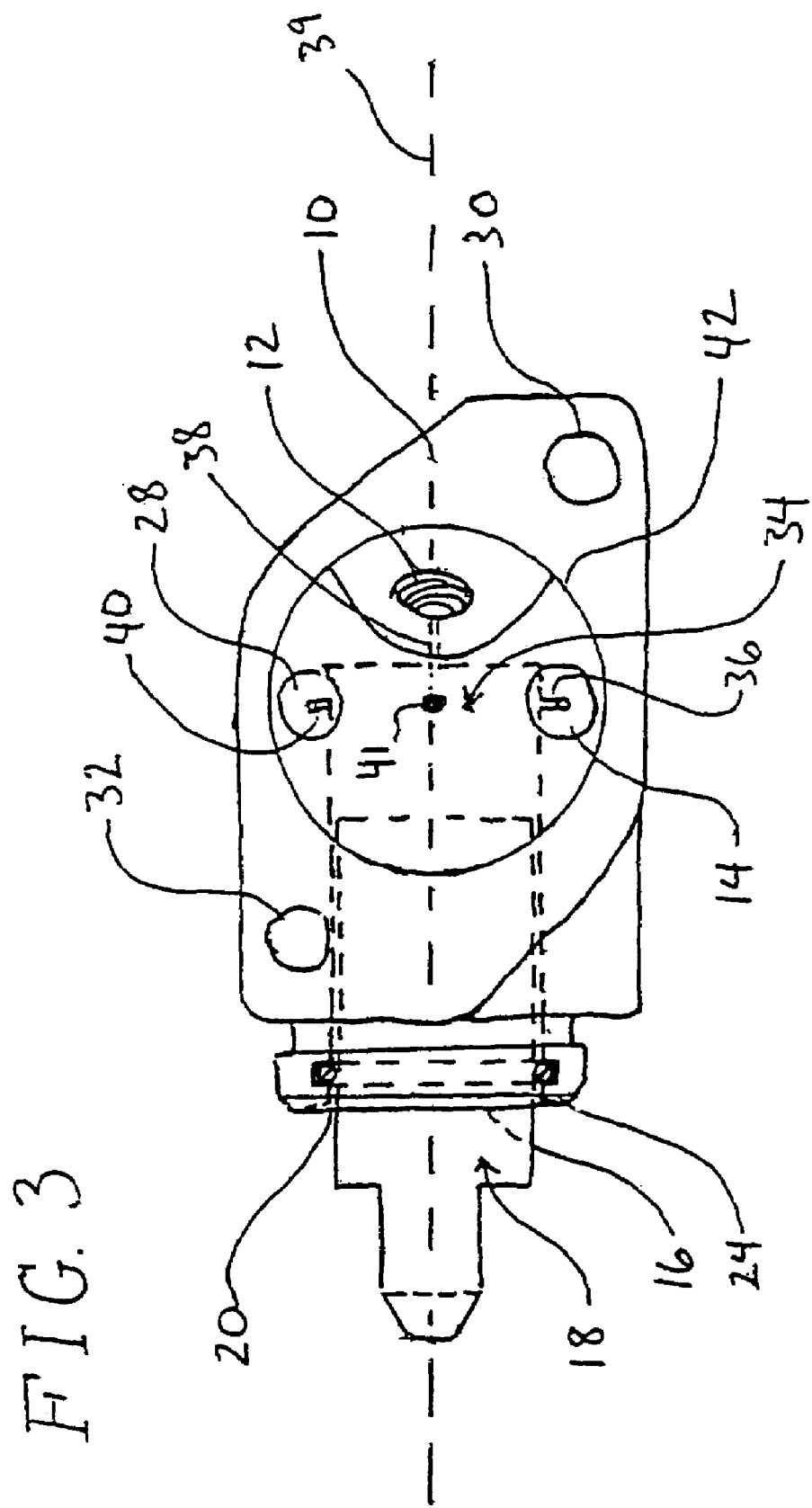
FIG. 3 is a side view of a second specific embodiment of the disclosed invention.

FIG. 3 shows a side view of a second specific embodiment of the disclosed invention. The cylinder body (10) has at least one open end (20) into a cylinder chamber (34), a bleeder valve (14) communicating with the cylinder chamber (34) through a bleeder passage (36), a hydraulic fluid inlet (12) communicating with the cylinder chamber (34) through an inlet passage (38) and a piston (18). The cylinder body (10) is mounted to the backing plate (not shown) with bolts (not shown) through the first bolt hole (30) and the second bolt hole (32). Under pedal pressure, hydraulic fluid is forced into the cylinder chamber (34) which drives the piston (18) out of the cylinder chamber (34) to press the brake shoes against the brake drum (not shown).

Conventional drum brake cylinders must be manufactured in left and right side versions so that the brake bleeder passage will be at the top of the cylinder, where air will rise and can be bled off. The improvement shown in FIG. 3 comprises an O-ring (24) disposed in an annular groove (16) in the cylinder chamber (34) adjacent the open end (20), the cylinder body (10) and the piston (18) are made of a corrosion-resistant metal such as stainless steel, the axial center (39) of the cylinder chamber (34) intersects the axial center (41) of a circular mounting face (42) and a second bleeder valve (28) communicating with the cylinder chamber (34) through a second bleeder passage (40) is disposed opposite the bleeder valve (14) in the circular mounting face (42). Owing to the use of alternate bleeder holes (36 and 40), the disclosed drum brake cylinder can be used in either left or right brakes and still have a bleeder valve at the top, which allows air to rise and be bled off. The first bolt hole (30) and the second bolt hole (32) are located opposite the center (41) of the circular mounting face (42) and at the same radius from the center of the circular mounting face (42). These improvements permit the improved drum brake hydraulic cylinder shown in FIG. 3 to be universally used in left side and right side applications, and to be repeatedly immersed in salt water and in fresh water without damage.

The drawings and description set forth here represent only some embodiments of the invention. After considering these, skilled persons will understand that there are many ways to make a waterproof drum brake hydraulic cylinder and a universal waterproof drum brake hydraulic cylinder according to the principles disclosed. The inventor contemplates that the use of alternative structures, materials, or manufacturing techniques, which result in a drum brake hydraulic cylinder according to the principles disclosed, will be within the scope of the invention.

What I claim is:

1. An improved drum brake hydraulic cylinder comprising a conventional drum brake hydraulic cylinder body with at least one open end into a cylinder chamber with an axial center, a piston, a circular mounting face with an axial center, a first bleeder valve in the mounting face communicating with the cylinder chamber through a bleeder passage, said bleeder valve and passage located in a highest vertical position when the drum brake cylinder body is mounted to a drum brake backing plate on one side of a car, and a hydraulic fluid inlet communicating with the cylinder, wherein the improvement comprises:

an O-ring disposed in an annular groove in the cylinder body adjacent the open end, wherein the O-ring contacts the piston to seal the cylinder chamber from contaminants entering from the at least one open end as the piston moves relative to the cylinder body, and wherein a single hydraulic chamber is formed by the piston between the open end and the cylinder chamber, the cylinder body and piston are made of a corrosion-resistant metal, the axial center of the cylinder chamber intersects the axial center of the circular mounting face, a second bleeder valve is disposed opposite the first bleeder valve in the circular mounting face in a lowest vertical position when the drum brake cylinder body is mounted to a drum brake backing plate on the one side of a car.

2. The improved drum brake hydraulic cylinder of claim 1, wherein the corrosion-resistant metal is stainless steel.

3. The improved drum brake hydraulic cylinder of claim 1 further comprising a cup seal disposed in the cylinder chamber aft of the piston.

4. The improved drum brake hydraulic cylinder of claim 1 further comprising an exterior rubber seal over the piston and over the open end of the cylinder chamber.

\* \* \* \* \*